United States Patent
Krauth

(10) Patent No.: US 11,858,331 B2
(45) Date of Patent: Jan. 2, 2024

(54) BODY STRUCTURE FOR AN ELECTRICALLY OPERATED VEHICLE

(71) Applicant: VOLKSWAGEN AKTIENGESELLSCHAFT, Wolfsburg (DE)

(72) Inventor: Werner Krauth, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 295 days.

(21) Appl. No.: 17/434,818

(22) PCT Filed: Jan. 30, 2020

(86) PCT No.: PCT/EP2020/052234
§ 371 (c)(1),
(2) Date: Aug. 30, 2021

(87) PCT Pub. No.: WO2020/173650
PCT Pub. Date: Sep. 3, 2020

(65) Prior Publication Data
US 2022/0144061 A1 May 12, 2022

(30) Foreign Application Priority Data
Feb. 28, 2019 (DE) ..................... 10 2019 202 753.9

(51) Int. Cl.
*B60K 1/04* (2019.01)
*B62D 25/20* (2006.01)

(52) U.S. Cl.
CPC ............. *B60K 1/04* (2013.01); *B62D 25/20* (2013.01); *B60K 2001/0438* (2013.01)

(58) Field of Classification Search
CPC .. B60K 1/04; B60K 2001/0438; B62D 25/20; B62D 25/2036; B62D 25/025; B60Y 2306/01

See application file for complete search history.

(56) References Cited

U.S. PATENT DOCUMENTS 9,412,984 B2  8/2016  Fritz et al.
10,112,470 B2  10/2018  Hamilton et al.
(Continued)

FOREIGN PATENT DOCUMENTS

CN   110636968 A  * 12/2019  .............. B60K 1/04
CN   210734286 U  *  6/2020  .............. B60K 1/04
(Continued)

OTHER PUBLICATIONS

Kuhl et al. DE 10 2018 211472A1 Fastening Device, Machine English Translation, ip.com (Year: 2020).*

*Primary Examiner* — Karen Beck
(74) *Attorney, Agent, or Firm* — Laurence A. Greenberg; Werner H. Stemer; Ralph E. Locher

(57) ABSTRACT

An electric vehicle body structure includes an installation space being downwardly open and upwardly delimited by a floor body-panel profile section. A traction battery is inserted into the space from below, a battery housing flange under the profile section is screwed from below to the profile section at a screw connection having a vertical screw bolt penetrating a housing flange passage and screw hole in the profile section and screwed to a weld nut at a flange housing opposite side of the profile section. The flange is clamped between screw bolt head and profile section. A crash displaces the battery until an inner passage wall presses screw bolt against screw hole edge, subjecting the screw bolt to shear load reduced by an elongated weld nut shaft projecting into the screw hole. The screw bolt presses against the screw hole edge, with the weld nut shaft in intermediate position.

7 Claims, 6 Drawing Sheets

(56) References Cited

U.S. PATENT DOCUMENTS

| | | | |
|---|---|---|---|
| 11,628,714 B2* | 4/2023 | Caliskan | B60K 1/04 |
| | | | 180/68.5 |
| 2012/0121959 A1 | 5/2012 | Yamada | |
| 2016/0207569 A1* | 7/2016 | Iwamoto | F16B 5/0208 |
| 2017/0058936 A1 | 3/2017 | Han et al. | |
| 2017/0305249 A1 | 10/2017 | Hara | |
| 2019/0359048 A1* | 11/2019 | Tsuyuzaki | B60K 1/04 |
| 2019/0359260 A1* | 11/2019 | Tsuyuzaki | H01M 50/249 |
| 2020/0070610 A1* | 3/2020 | Samyn | B60K 1/04 |
| 2021/0221436 A1* | 7/2021 | Tsuyuzaki | B62D 25/025 |

FOREIGN PATENT DOCUMENTS

| | | | | |
|---|---|---|---|---|
| DE | 8331845 U1 | 4/1984 | | |
| DE | 9320666 U1 | 1/1995 | | |
| DE | 19901299 C1 | 9/2000 | | |
| DE | 102009040679 A1 | 3/2011 | | |
| DE | 102011102412 A1 | 11/2012 | | |
| DE | 102011113112 A1 | 3/2013 | | |
| DE | 102012015817 A1 | 2/2014 | | |
| DE | 102015101096 A1 | 7/2016 | | |
| DE | 102015016492 A1 | 6/2017 | | |
| DE | 102018100152 A1 | 7/2018 | | |
| DE | 102018208447 B3 * | 8/2019 | | |
| DE | 102018211472 A1 * | 1/2020 | | |
| DE | 102018217649 A1 * | 4/2020 | | B62D 25/025 |
| DE | 102019108910 A1 * | 10/2020 | | F16B 19/1072 |
| GB | 742744 A | 1/1956 | | |

* cited by examiner

BODY STRUCTURE FOR AN ELECTRICALLY OPERATED VEHICLE

BACKGROUND OF THE INVENTION

Field of the Invention

The invention relates to a body structure for an electrically operated vehicle according to the preamble of claim 1.

An electrically operated vehicle can have an installation space for a traction battery, which installation space is open in the vehicle vertical direction in the direction of the bottom of the vehicle and is delimited in the direction of the top of the vehicle by a vehicle floor sheet-metal part. In this case, the traction battery can be inserted into the installation space from beneath the vehicle and screwed to the body structure. The traction battery installation space can be delimited in the vehicle longitudinal direction by front and rear cross-members of the body structure and can be delimited in the vehicle transverse direction by lateral sills of the vehicle. In the event of a crash (from the side, in the longitudinal direction or off-center, that is to say an offset crash), the traction battery can thus act as a shear panel by means of which the crash energy is transmitted from a side of the vehicle facing the crash to a side of the vehicle remote from the crash.

In a body structure according to the preamble, a housing flange of the traction battery engages beneath a body-side sheet-metal profile part of a lateral sill or of a cross-member of the body structure. The housing flange of the traction battery is screwed to the sheet-metal profile part from beneath the vehicle at at least one screw position. The screw position has a screw bolt oriented in the vehicle vertical direction, which screw bolt is guided with hole play through a housing flange through-channel and through a sheet-metal profile part screw hole and is screwed to a weld nut. The weld nut is welded to the side of the sheet-metal profile part that is remote from the housing flange. In the assembled state, the traction battery housing flange is therefore clamped between a screw head of the screw bolt and the sheet-metal profile part.

In the event of a crash, the traction battery, as a result of the crash, is displaced (transversely to the screw direction) until an inside wall of the housing flange through-channel touches the screw bolt, using all the hole play, and the screw bolt presses against an opening rim of the sheet-metal profile part screw hole, namely with shear loading of the screw bolt.

The sheet-metal profile part is in most cases in the form of a high-strength hot-formed part so that, in the event of a crash as above, the cut edge thereof acts like a blade on the screw bolt. Accordingly, there is a risk that the screw bolt will be sheared off as a result of the shear load acting thereon.

From DE 10 2011 102 2 A1 there is known an arrangement of a traction battery in a vehicle. From DE 93 20 666 U1 there is known a connecting element for use in pulse resistance welding according to the capacitor discharge principle.

SUMMARY OF THE INVENTION

The object of the invention consists in providing a body structure for an electrically operated vehicle in which crash-resistant connection of the traction battery to the body structure is made possible in a simple manner.

The object is achieved by the features described below. Preferred further developments of the invention are disclosed in the dependent claims.

According to the characterizing part, the weld nut is prolonged by a shaft in order to reduce the shear load due to the crash. The weld nut shaft projects at least into the sheet-metal profile part screw hole. In the event of a crash, the screw bolt is thus no longer pressed directly against the opening rim (that is to say the cut edge) of the sheet-metal profile part screw hole, but rather with the interposition of the weld nut shaft. Accordingly, by providing the weld nut shaft, it is no longer only the screw bolt core diameter that is opposed as a "partner" to the shear load. Rather, by using the weld nut shaft, the effective screw bolt diameter that acts against this shear load is increased.

In a technical implementation, the weld nut shaft can protrude beyond the side of the sheet-metal profile part that faces the housing flange with a projecting length. Accordingly, the weld nut shaft extends into the housing flange through-channel. In the event of a crash, the inside wall of the housing flange through-channel thus no longer presses directly against the screw bolt, but rather with the interposition of the weld nut shaft.

In the assembled state, the screw head of the screw bolt is clamped against an opening rim region of the housing flange through-channel. In order to ensure a problem-free screw connection, the shaft end face of the weld nut shaft that faces the bolt head of the screw bolt can be spaced apart from the bolt head of the screw bolt by an axial clearance.

It is preferred if the inside wall of the housing shaft through-channel does not have a constant inside diameter over the entire channel length but instead is divided into a channel portion of large diameter and a channel portion of small diameter, which channel portions merge into one another at an annular shoulder. In this case, the channel portion of small diameter can preferably merge on the side that faces the screw head into the end-face opening rim region of the housing flange through-channel, against which the screw head of the screw bolt is clamped. The channel portion of small diameter ensures a sufficiently large supporting surface between the screw head and the end-face opening rim region of the housing flange through-channel. The channel portion of large diameter, on the other hand, ensures that there is a free radial gap between the weld nut shaft and the inside wall of the housing flange through-channel.

According to the invention, both the inside wall of the housing flange through-channel and the weld nut shaft are formed with stop contours in order, in the event of a crash, to ensure problem-free force transmission from the traction battery into the body-side sheet-metal profile part, namely with largely force-free bridging of the screw bolt, in order to avoid screw bolt material failure.

Against this background, the axial length of the channel portion of small diameter can be smaller than the axial clearance between the end face of the weld nut shaft and the bolt head of the screw bolt. The channel portion of small diameter and the axial clearance can preferably be arranged in radial alignment with one another.

In this case, the preferred crash profile described hereinbelow is obtained: The channel portion of large diameter of the housing flange through-channel can come into contact with the outer circumference of the weld nut shaft transversely to the screw direction, while the channel portion of small diameter enters the axial clearance (between the shaft end face and the bolt head of the screw bolt).

In addition, the outer circumference of the weld nut shaft can merge at a circumferential outer corner into the shaft end face. Correspondingly, an inner corner can be formed between the channel portion of large diameter and an annular surface of the annular shoulder, which inner corner forms a negative form of the shaft outer corner. In this case, in the event of a crash, the inner corner in the housing flange through-channel can engage in an interlocking manner around the shaft outer corner.

In order to reduce the shear load on the screw bolt, it is important that direct contact between the channel portion of small diameter of the housing flange through-channel and the bolt shaft of the screw bolt is avoided. Against this background, the channel portion of small diameter can protrude radially inwards relative to the radial portion of large diameter by a radial offset. The radial offset can be smaller than a wall thickness of the weld nut shaft. Accordingly, it is ensured that, in the event of a crash, the channel portion of small diameter remains out of contact with the bolt shaft of the screw bolt.

In a further embodiment, the housing flange can be clamped against the sheet-metal profile part with the interposition of a clamping sleeve, which is of rotationally symmetrical form. The clamping sleeve can be supported on the housing flange by a supporting base which has a hollow cylindrical lower, in terms of the vehicle, sleeve portion which merges at a transition edge into a radially outwardly protruding circumferential rim flange. The screw bolt is guided through the clamping sleeve. The hollow cylindrical sleeve portion can be in contact with the inside wall of the channel portion of large diameter of the housing flange through-channel, while the transition edge and the radially outwardly protruding supporting flange is supported on the opening rim of the housing flange through-channel that faces the sheet-metal profile part. In addition, the clamping sleeve can be supported on the opening rim region of the sheet-metal profile part screw hole by an upper, in terms of the vehicle, sleeve portion.

An exemplary embodiment of the invention will be described hereinbelow with reference to the accompanying figures.

DETAILED DESCRIPTION OF THE INVENTION

Figure 1:
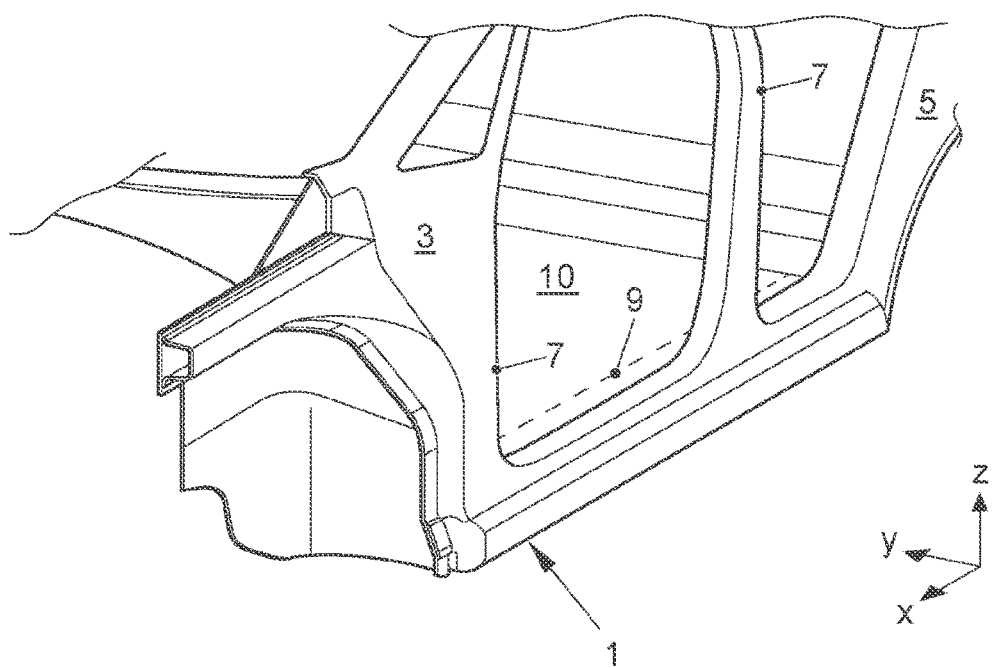
FIG. 1 shows, in a perspective partial spatial view, a body structure of an electrically operated vehicle.

In FIG. 1 there is shown the body structure of a two-track vehicle, which will be described hereinbelow inasmuch as it is required for the understanding of the invention. Accordingly, the body structure has two lateral sills 1 running in the vehicle longitudinal direction x, only one of which is shown in FIG. 1. The sill 1 extends in the vehicle longitudinal direction x between a front A-pillar 3 and a rear C-pillar 5 and delimits side door openings 7 at the bottom. A crash-sensitive traction battery 9 is installed in the vehicle floor of the body structure. The traction battery is positioned beneath a floor sheet-metal part 10 and extends in the vehicle transverse direction y between the two sills 1. In the vehicle longitudinal direction x, the traction battery 9 extends between a front cross-member and a rear cross-member, which are not shown in the figures.

Figure 2:
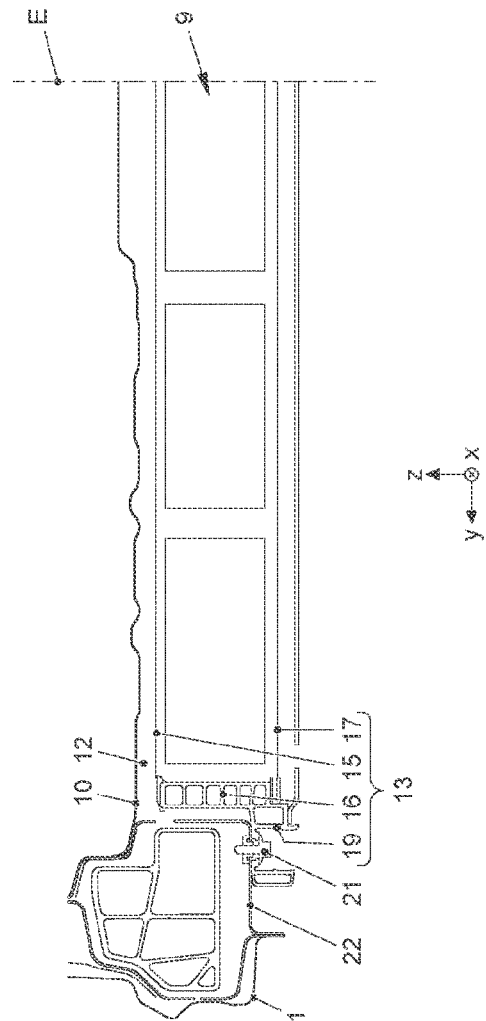
FIG. 2 is a partial sectional view along a sectional plane yz from FIG. 1.

As is apparent from FIG. 1, the traction battery 9, when viewed in the vehicle vertical direction z, is positioned at approximately the same height as the sills 1. In FIG. 2, the traction battery 9 has a battery housing 13, namely with a housing side wall 16, a top wall 15 and a bottom wall 17. The housing side wall 16 is configured with a laterally protruding housing flange 19, which engages beneath the sill 1 and is in a screw connection 21 with a sheet-metal profile part 22 of the sill 1. In FIG. 2, only half the body structure up to the vehicle mid-plane E is shown. The other half which is not shown is approximately the mirror image thereof. In the event of a side crash described hereinbelow, the impact forces C (FIG. 4) are transmitted from the sill 1 that faces the crash in a transverse load path, which includes the traction battery 9 as a rigid shear panel, in the direction towards the sill 1 that is remote from the crash.

Figure 3:
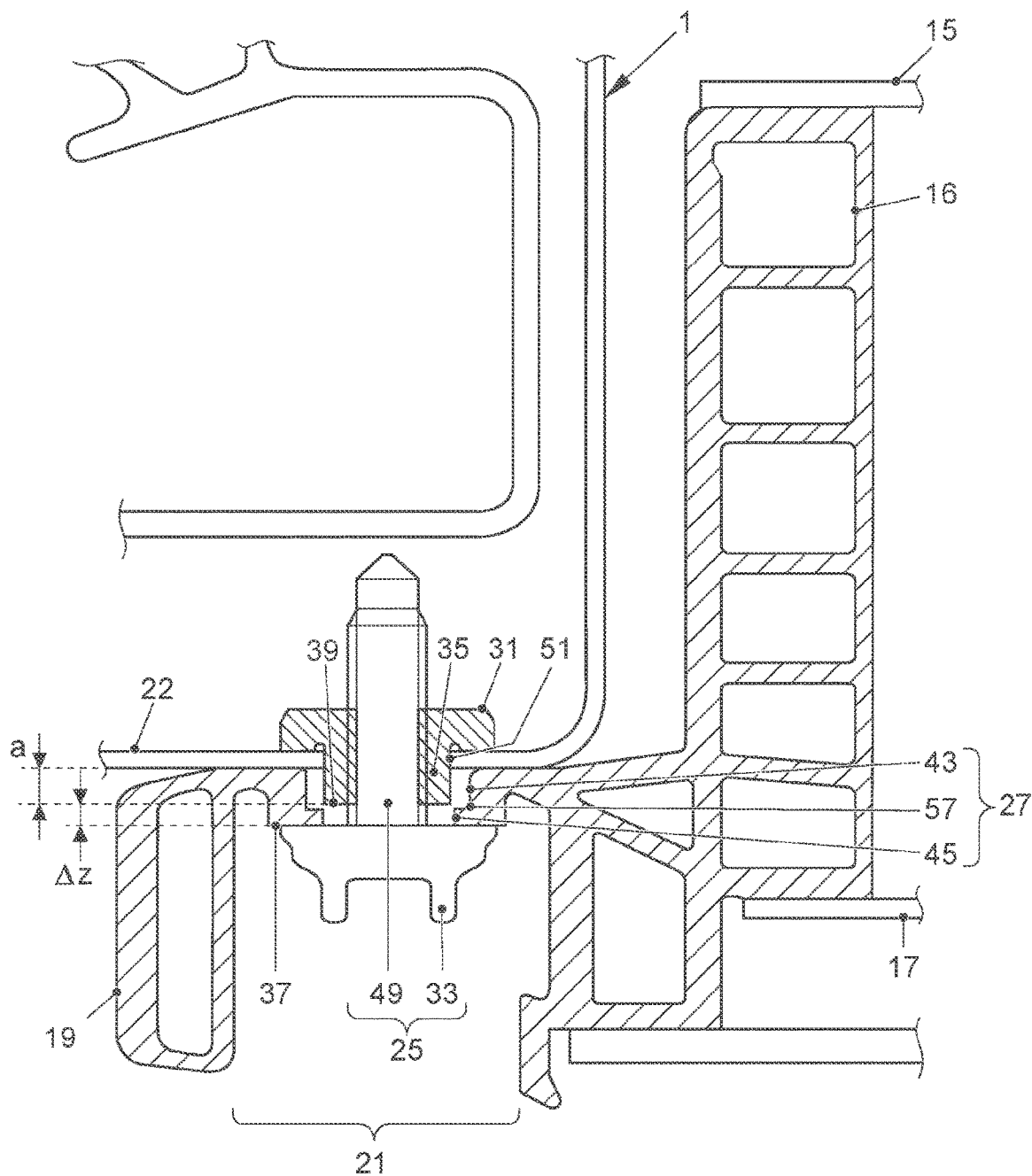
FIG. 3 is an enlarged sectional view of a screw position from FIG. 2 during normal driving operation.

The screw position 21 will be described hereinbelow with reference to FIG. 3: According to that figure, the housing flange 19 is screwed in place from beneath the vehicle by means of a screw bolt 25 oriented in the vehicle vertical direction z. The screw bolt 25 is guided with hole play through a housing flange through-channel 27 and through a sheet-metal profile part screw hole and is screwed to a weld nut 31. In FIG. 3, the weld nut 31 is welded to the side of the sheet-metal profile part 22 that is remote from the housing flange 19. Accordingly, the housing flange 19 is clamped between a screw head 33 of the screw bolt 25 and the sheet-metal profile part 22.

In FIG. 3, the weld nut 31 is prolonged by a shaft 35, which extends through the sheet-metal profile part screw hole and protrudes with a projecting length a beyond the side of the sheet-metal profile part 22 that faces the housing flange 19. The screw head 33 of the screw bolt 25 is clamped in FIG. 3 against an end-face opening rim region 37 of the housing flange through-channel 27. In addition, in FIG. 3 the end face 39 of the weld nut shaft 35 that faces the bolt head 33 of the screw bolt 25 is spaced apart from the bolt head 33 of the screw bolt 25 by an axial clearance $\Delta z$.

As is further apparent from FIG. 3, an inside wall of the housing flange through-channel 27 has a channel portion of large diameter 43 and a channel portion of small diameter 45, which channel portions merge into one another at an annular shoulder. The channel portion of small diameter 45 merges on the side that faces the screw head 33 into the opening rim region 37 of the housing flange through-channel 19, against which the screw head 33 of the screw bolt 25 is clamped.

The axial length b (FIG. 4) of the channel portion of small diameter 45 is smaller than the axial clearance $\Delta z$ between the shaft end face 39 and the bolt head 33 of the screw bolt 25. In addition, the channel portion of small diameter 45 and the axial clearance $\Delta z$ are arranged in FIG. 3 so as to be in radial alignment (i.e. in the vehicle transverse direction y) with one another.

The crash profile in the event of a side crash in which the traction battery 9 is displaced in a crash direction C (FIG. 4) within the installation space 12 in the vehicle transverse direction y will be described hereinbelow: Accordingly, the channel portion of large diameter 43 of the housing flange through-channel 27 comes up against the outer circumference of the weld nut shaft 35, while the channel portion of small diameter 45 enters the axial clearance $\Delta z$ between the shaft end face 39 and the bolt head 33.

Figure 4:
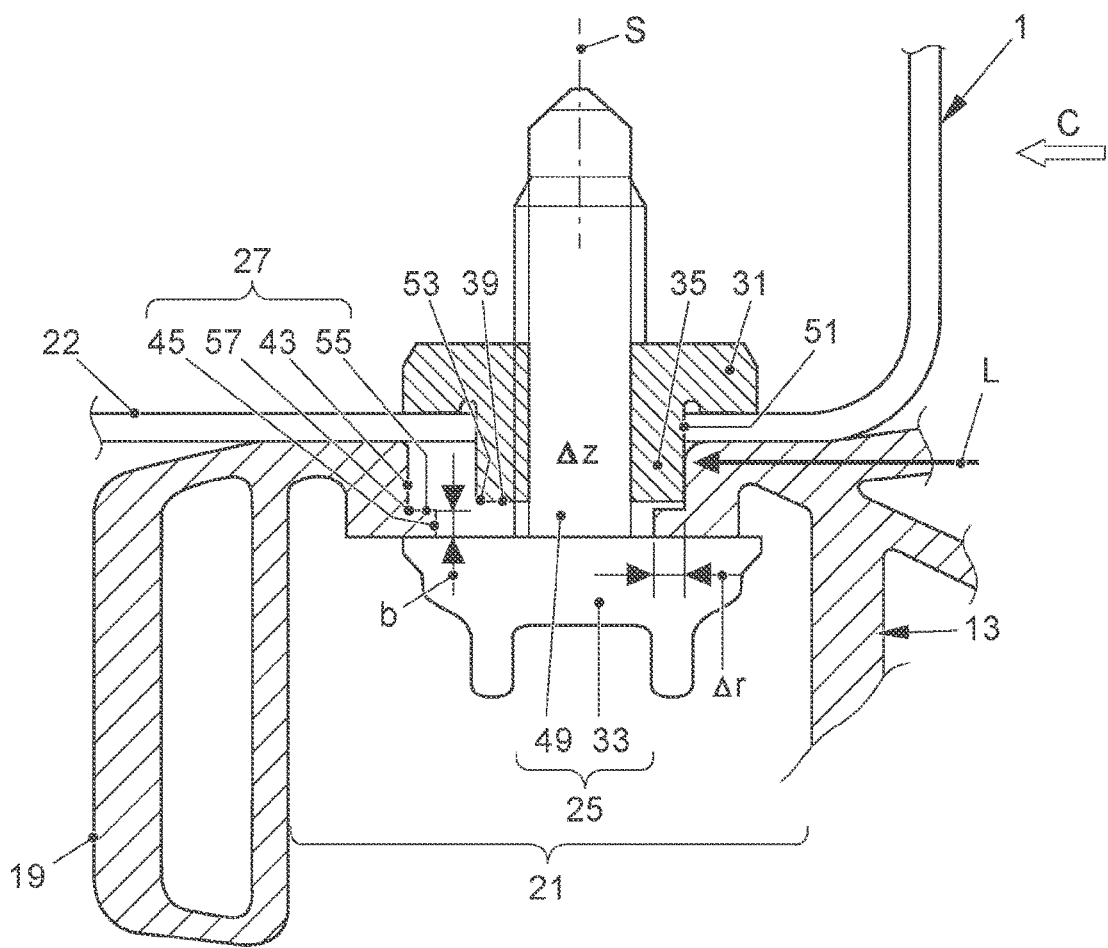
FIG. 4 is a view corresponding to FIG. 3 in the event of a side crash.

In FIG. 3, the channel portion of small diameter 45 is offset radially inwards relative to the channel portion of large diameter 43 by a radial offset Δr. The radial offset Δr is thereby smaller than a wall thickness of the weld nut shaft 35. In this manner it is ensured that, in the event of a crash (FIG. 4), the channel portion of small diameter 45 remains out of contact with the bolt shaft 49 of the screw bolt 25. By means of the above component geometry at the screw position 21, the crash load path L indicated in FIG. 4 is obtained, in which the crash load is transferred from the battery housing 13 via the housing flange 19 thereof into the weld nut shaft 35 and, from there, is transmitted via the opening rim (that is to say the cut edge) 51 into the sheet-metal profile part 22 of the body. The bolt shaft 49 of the screw bolt 25 thus does not come into direct contact either with the cut edge 51 of the sheet-metal profile part 22 or with the inside wall of the housing flange through-channel 27, whereby a shear load acting on the screw bolt 25 transversely to the screw direction S is reduced.

As is further apparent from FIGS. 3 and 4, the outer circumference of the weld nut shaft 35 merges at a circumferential outer corner 53 into the shaft end face 39. Analogously thereto, a circumferential inner corner 57 is spanned in FIG. 3 between the channel portion of large diameter 43 and an annular surface 55, which inner corner forms a negative form of the shaft outer corner 53. In the event of a crash (FIG. 4), the housing flange inner corner 57 engages in an interlocking manner around the shaft outer corner 53.

Figure 5:
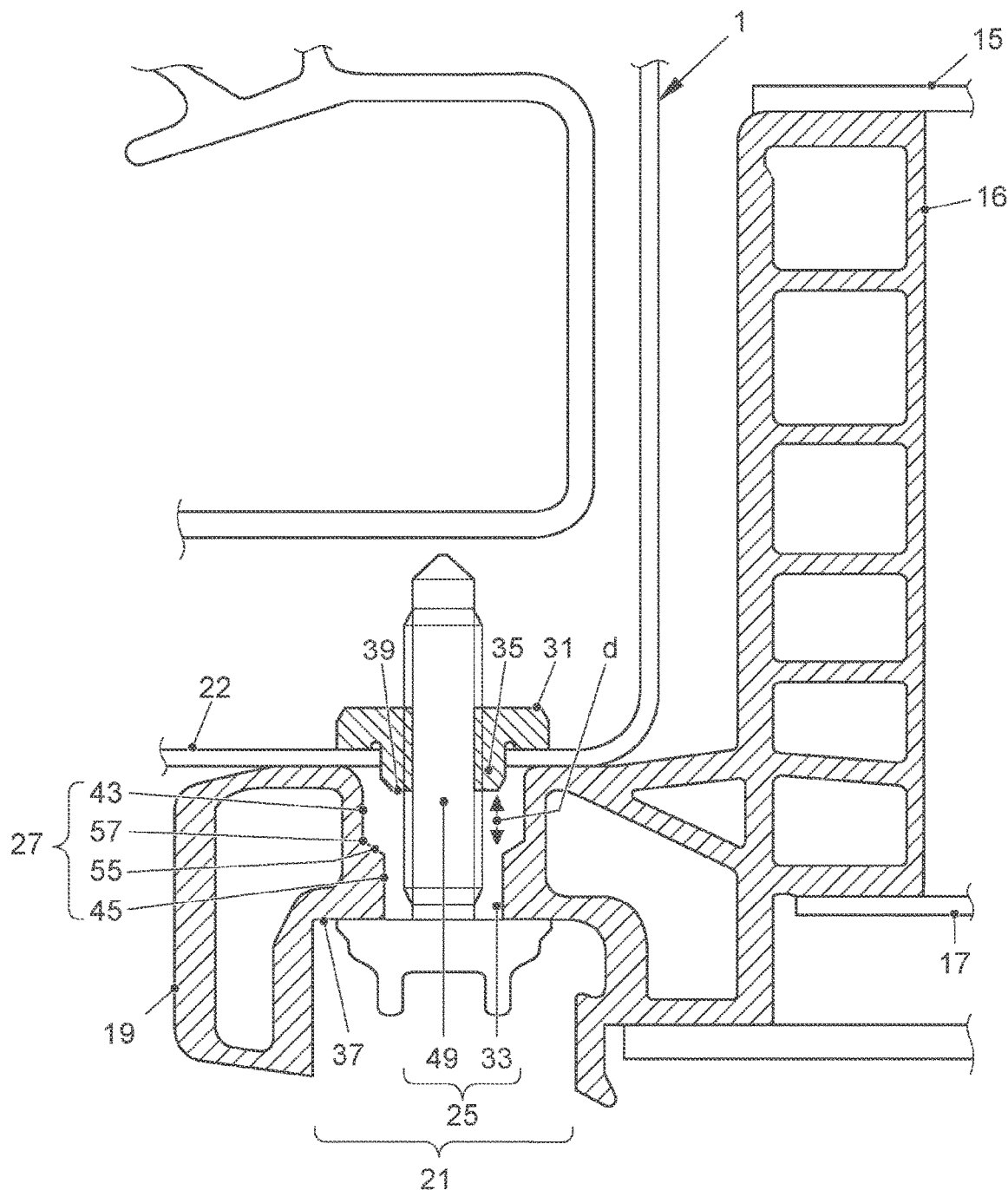
FIGS. 5 and 6 are each views of further exemplary embodiments.

FIG. 5 is a view corresponding to FIG. 3 of a screw position 21 according to a second exemplary embodiment, the geometry of which is substantially identical in terms of construction to that of the preceding first exemplary embodiment. Unlike in FIG. 3 or 4, in FIG. 5 the annular surface 55 of the annular shoulder is spaced apart from the shaft end face 49 by a free axial distance d.

Figure 6:
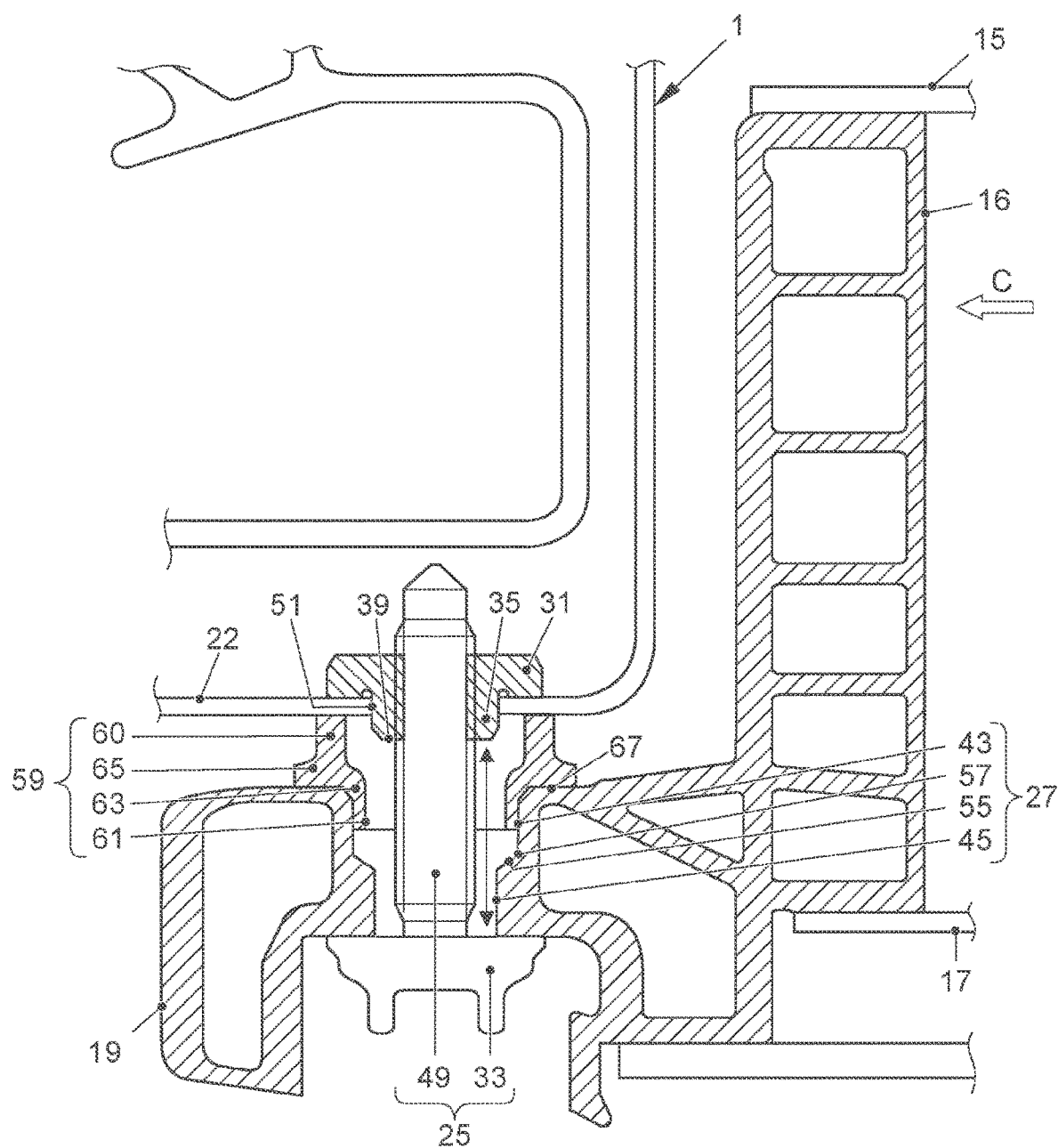

FIG. 6 shows a screw connection 21 according to a further exemplary embodiment. Accordingly, in FIG. 6, the housing flange 19 is clamped against the sheet-metal profile part 22 with the interposition of a clamping sleeve 59, which is rotationally symmetrical in form. The clamping sleeve 59 is supported on the housing flange 19 by a supporting base. In FIG. 6, the supporting base consists of a hollow cylindrical lower, in terms of the vehicle, sleeve portion 61 which merges at a transition edge 63 into a radially outwardly protruding circumferential rim flange 65. The screw bolt 25 is guided through the clamping sleeve 59. In FIG. 6, the hollow cylindrical sleeve portion 61 is in contact with the channel portion of large diameter 43 of the housing flange through-channel 27, while the transition edge 63 and the radially outwardly protruding supporting flange 65 is supported on the opening rim region 67 of the housing flange through-channel 27 that faces the sheet-metal profile part 22. In addition, the clamping sleeve 59 is supported on the opening rim region of the sheet-metal profile part screw hole by an upper, in terms of the vehicle, sleeve portion 60.

The crash profile in the event of a side crash in which the traction battery is displaced in a crash direction C (FIG. 6) within the installation space 12 in the vehicle transverse direction y will be described hereinbelow: Accordingly, the upper, in terms of the vehicle, sleeve portion 60 of the clamping sleeve 59 comes up against the outer circumference of the weld nut shaft 35, while the lower, in terms of the vehicle, sleeve portion 61 of the clamping sleeve 59 enters the axial clearance Δz between the shaft end face 39 and the bolt head 33, without touching the bolt shaft 49 of the screw bolt 25.

LIST OF REFERENCE NUMERALS 1 sill
3 A-pillar
5 C-pillar
7 side door opening
9 traction battery
10 floor sheet-metal part
12 installation space
13 battery housing
16 housing side wall
15 top wall
17 bottom wall
19 housing flange
21 screw connection
22 sheet-metal profile part
25 screw bolt
27 housing flange through-channel
31 weld nut
33 screw head
35 weld nut shaft
37 opening rim region
39 shaft end face
43 channel portion of large diameter
45 channel portion of small diameter
49 bolt shaft
51 cut edge
53 outer corner
55 annular surface
57 inner corner
59 clamping sleeve
60 upper, in terms of the vehicle, sleeve portion
61 lower, in terms of the vehicle, sleeve portion
63 transition edge
65 supporting flange
67 opening rim region
E vehicle median longitudinal plane
S screw direction
L load path
a projecting length
b axial length
d free axial distance
Δz axial clearance
Δr radial offset

The invention claimed is:

1. A body structure for an electrically operated vehicle, the body structure comprising:
   a bottom of the vehicle and a top of the vehicle defining a vehicle vertical direction, a vehicle floor sheet-metal part and a body-side sheet-metal profile part;
   an installation space for a traction battery, said installation space being open in said vehicle vertical direction in a direction towards said bottom of the vehicle and delimited by said vehicle floor sheet-metal part in a direction towards said top of the vehicle, said installation space configured for insertion of the traction battery from beneath the vehicle;
   a housing flange for the traction battery, said housing flange engaging beneath said sheet-metal profile part and being screwed to said sheet-metal profile part from beneath the vehicle at least at one screw position;
   a weld nut welded to a side of said sheet-metal profile part facing away from said housing flange, said weld nut being extended by a shaft;
   said screw position having a screw bolt being oriented in said vehicle vertical direction and having a screw head, said screw bolt being guided with hole play through a through-channel in said housing flange and through a screw hole in said sheet-metal profile part, said screw bolt being screwed to said weld nut for clamping said housing flange between said screw head of said screw bolt and said sheet-metal profile part;

in an event of a crash, the traction battery being displaced, as a result of the crash, until an inside wall of said housing flange through-channel presses said screw bolt against an opening rim of said sheet-metal profile part screw hole, with shear loading of said screw bolt;

said shaft of said weld nut projecting at least into said sheet-metal profile part screw hole to reduce the shear loading and, in the event of the crash, said screw bolt pressing against said opening rim of said sheet-metal profile part screw hole with an interposition of said weld nut shaft; and said weld nut shaft protruding beyond a side of said sheet-metal profile part facing towards said housing flange, or said weld nut shaft projecting into said housing flange through-channel with a projection length, and in the event of the crash, said inside wall of said housing flange through-channel pressing against said screw bolt with an interposition of said weld nut shaft.

2. The body structure according to claim 1, wherein:

said screw head of said screw bolt is clamped against an opening rim region of said housing flange through-channel, or an end face of said weld nut shaft facing towards said bolt head of said screw bolt is spaced apart from said bolt head of said screw bolt by an axial clearance.

3. The body structure according to claim 2, wherein said inside wall of said housing flange through-channel has a channel portion with a relatively larger diameter and a channel portion with a relatively smaller diameter, said channel portions merge into one another at an annular shoulder, and said channel portion with a relatively smaller diameter opens on a side facing towards said screw head into an opening rim region of said housing flange through-channel, against which said screw head of said screw bolt is clamped.

4. The body structure according to claim 3, wherein:

said channel portion with a relatively smaller diameter has an axial length being smaller than said axial clearance between said end face of said weld nut shaft and said bolt head of said screw bolt, or said channel portion with a relatively smaller diameter and said axial clearance are disposed in radial alignment with one another; and in the event of the crash, said channel portion with a relatively larger diameter comes into contact with an outer periphery of said weld nut shaft transversely to a screw direction, and said channel portion with a relatively smaller diameter enters said axial clearance.

5. The body structure according to claim 4, wherein said outer periphery of said weld nut shaft merges at a circumferential outer corner into said shaft end face, a circumferential inner corner is spanned between said channel portion with a relatively larger diameter and an annular surface of said annular shoulder, said circumferential inner corner forms a negative shape of said shaft outer corner and, in the event of the crash, said circumferential inner corner in said housing flange through-channel engages in a form-locking manner around said shaft outer corner.

6. The body structure according to claim 4, wherein said channel portion with a relatively smaller diameter protrudes radially inwards relative to said channel portion with a relatively larger diameter by a radial offset, and said radial offset is smaller than a wall thickness of said weld nut shaft so that, in the event of the crash, said channel portion with a relatively smaller diameter remains out of contact with a bolt shaft of said screw bolt.

7. A body structure for an electrically operated vehicle, the body structure comprising:

a bottom of the vehicle and a top of the vehicle defining a vehicle vertical direction, a vehicle floor sheet-metal part and a body-side sheet-metal profile part;

an installation space for a traction battery, said installation space being open in said vehicle vertical direction in a direction towards said bottom of the vehicle and delimited by said vehicle floor sheet-metal part in a direction towards said top of the vehicle, said installation space configured for insertion of the traction battery from beneath the vehicle;

a housing flange for the traction battery, said housing flange engaging beneath said sheet-metal profile part and being screwed to said sheet-metal profile part from beneath the vehicle at least at one screw position;

a weld nut welded to a side of said sheet-metal profile part facing away from said housing flange, said weld nut being extended by a shaft;

said screw position having a screw bolt being oriented in said vehicle vertical direction and having a screw head, said screw bolt being guided with hole play through a through-channel in said housing flange and through a screw hole in said sheet-metal profile part, said screw bolt being screwed to said weld nut for clamping said housing flange between said screw head of said screw bolt and said sheet-metal profile part;

in an event of a crash, the traction battery being displaced, as a result of the crash, until an inside wall of said housing flange through-channel presses said screw bolt against an opening rim of said sheet-metal profile part screw hole, with shear loading of said screw bolt;

said shaft of said weld nut projecting at least into said sheet-metal profile part screw hole to reduce the shear loading and, in the event of the crash, said screw bolt pressing against said opeing rim of said sheet-metal profile part screw hole with an interposition of said weld nut shaft;

said screw head of said screw bolt being clamped against an opening rim region of said housing flange through-channel, or an end face of said weld nut shaft facing towards said bolt head of said screw bolt being spaced apart from said bolt head of said screw bolt by an axial clearance;

said inside wall of said housing flange through-channel having a channel portion with a relatively larger diameter and a channel portion with a realtively small diameter, said channel portions merging into one another at an annular shoulder, and said channel portion with a relatively smaller diameter opening on a side facing towards said screw head into an opening rim region of said housing flange through-channel, against which said screw head of said screw bolt being clamped;

said channel portion with a relatively smaller diameter having an axial length being smaller than said axial clearance between said end face of said weld nut shaft and said bolt head of said screw bolt, or said channel portion with a relatively smaller diameter and said axial clearance being disposed in radial alignment with one another;

in the event of the crash, said channel portion with a relatively larger diameter coming into contact with an outer periphery of said well nut shaft transversely to a screw direction, and said channel portion with a relatively smaller diameter entering said axial clearance;

said housing flange being clamped against said sheet-metal profile part with an interposition of a clamping sleeve, said clamping sleeve being supported on said housing flange by a supporting base, said supporting base having, in the vehicle vertical direction, a lower sleeve portion merging at a transition edge into a radially outwardly protruding circumferential rim flange, or said lower sleeve portion being in contact with said channel portion with a relatively larger diameter of said housing flange through-channel, said transition edge and a radially outwardly protruding supporting flange being supported on an opening rim region of said housing flange through-channel facing towards said sheet-metal profile part, or said clamping sleeve being supported on said opening rim region of said sheet-metal profile part screw hole by an upper, in the vehicle vertical direction, sleeve portion.

* * * * *